United States Patent
Indukuru et al.

(10) Patent No.: US 8,234,484 B2
(45) Date of Patent: *Jul. 31, 2012

(54) QUANTIFYING COMPLETION STALLS USING INSTRUCTION SAMPLING

(75) Inventors: Venkat Rajeev Indukuru, Austin, TX (US); Alexander Erik Mericas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 655 days.

This patent is subject to a terminal disclaimer.

(21) Appl. No.: 12/099,944

(22) Filed: Apr. 9, 2008

(65) Prior Publication Data
US 2009/0259830 A1    Oct. 15, 2009

(51) Int. Cl.
G06F 9/30    (2006.01)
(52) U.S. Cl. .......................................... 712/227
(58) Field of Classification Search ................. None
See application file for complete search history.

(56) References Cited

U.S. PATENT DOCUMENTS

| | | | |
|---|---|---|---|
| 5,987,598 A * | 11/1999 | Levine et al. ............... | 712/227 |
| 6,338,159 B1 * | 1/2002 | Alexander et al. ............ | 717/128 |
| 6,550,002 B1 | 4/2003 | Davidson | |
| 6,574,727 B1 | 6/2003 | Davidson | |
| 6,880,072 B1 | 4/2005 | Giles | |
| 7,047,398 B2 | 5/2006 | Kurihara | |
| 7,086,035 B1 | 8/2006 | Mericas | |
| 7,114,058 B1 | 9/2006 | Trivedi | |
| 7,152,152 B2 | 12/2006 | Barrick | |
| 7,257,657 B2 | 8/2007 | DeWitt, Jr. | |
| 2004/0024994 A1 * | 2/2004 | Kurihara et al. ............. | 712/227 |
| 2004/0186982 A9 | 9/2004 | Becker | |
| 2006/0179280 A1 | 8/2006 | Jensen | |
| 2006/0190703 A1 | 8/2006 | Carrie | |
| 2006/0224864 A1 | 10/2006 | DeMent | |
| 2007/0083742 A1 | 4/2007 | Abernathy | |
| 2007/0113053 A1 | 5/2007 | Jensen | |

OTHER PUBLICATIONS

Norris, Frank. "RISC vs. CISC". Apr. 4, 2002. 17 pages. Obtained via atlas.kennesaw.edu/~fnorris/Risc_vs_Cisc.ppt.*
U.S. Appl. No. 11/753,005, filed May 24, 2007.

* cited by examiner

*Primary Examiner* — Robert Fennema
(74) *Attorney, Agent, or Firm* — Yudell Isidore Ng Russell PLLC

(57) ABSTRACT

A method, computer program product, and data processing system for collecting metrics regarding completion stalls in an out-of-order superscalar processor with branch prediction is disclosed. A preferred embodiment of the present invention selectively samples particular instructions (or classes of instructions). Each selected instruction, as it passes through the processor datapath, is marked (tagged) for monitoring by a performance monitoring unit. The progress of marked instructions is monitored by the performance monitoring unit, and various stall counters are triggered by the progress of the marked instructions and the instruction groups they form a part of. The stall counters count cycles to give an indication of when certain delays associated with particular instructions occur and how serious the delays are.

18 Claims, 5 Drawing Sheets

QUANTIFYING COMPLETION STALLS USING INSTRUCTION SAMPLING

CROSS-REFERENCE TO RELATED APPLICATIONS

The subject matter of the present application is related to the following commonly-assigned U.S. patents and pending patent applications, which are incorporated herein by reference in their entirety: U.S. Pat. No. 6,574,727, entitled "Method and Apparatus for Instruction Sampling for Performance Monitoring and Debug;" U.S. Pat. No. 7,047,398, entitled "Method and System for Identifying Instruction Completion Delays in a Processor;" U.S. patent application Ser. No. 11/753,005, filed May 24, 2007, and entitled "Method and Apparatus for Instruction Completion Stall Identification in an Information Handling System".

BACKGROUND OF THE INVENTION

1. Technical Field

The present invention relates generally to data processing systems, and more particularly, to data processing systems having a capability to record information regarding executional delays, such as stall conditions.

2. Description of the Related Art

Data processing systems, and in particular superscalar and pipelined processors, frequently experience "stall conditions" or "stalls," which are events that delay the completion of one or more instructions by a clock cycle or more. Stalls may occur for various reasons, such as branch mispredictions (which typically require a lengthy "pipeline flush" to resolve), delay in accessing data (e.g., due to cache misses), and high latency instructions (such as many floating point operations).

While some stalls are unavoidable, it is generally desirable to minimize the number of stall conditions a processor incurs whenever possible, as a significant number of stalls can seriously degrade processor performance. As with many aspects of the computer architecture field, the number of stalls incurred by a processor is a function of both the processor's design and the design of the software being executed on the processor (which is often, in turn, largely dictated by the design of the compiler used to produce the software). The design of either hardware or software for a given platform so as to minimize stalls, not surprisingly, requires the hardware or software engineer to obtain a fair level of insight into the causes behind stalls and the extent to which particular instructions lead to performance degrading stall conditions.

Previous work in this area, such as the herein-incorporated U.S. Pat. No. 7,047,398 and U.S. patent application Ser. No. 11/753,005 has focused on determining a basic cause of a stall emanating from a group of instructions in a superscalar processor. However, the current state of the art does not provide a way to monitor the stall-related characteristics of individual instructions.

What is needed, therefore, is a method and apparatus for monitoring a particular instruction (or class of instruction's) propensity to cause stalls. The present invention provides a solution to this and other problems, and offers other advantages over previous solutions.

SUMMARY OF THE INVENTION

Accordingly, the present invention provides a method, computer program product, and data processing system for collecting metrics regarding completion stalls in an out-of-order superscalar processor with branch prediction. A preferred embodiment of the present invention selectively samples particular instructions (or classes of instructions). Each selected instruction, as it passes through the processor datapath, is marked (tagged) for monitoring by a performance monitoring unit. The progress of marked instructions is monitored by the performance monitoring unit, and various stall counters are triggered by the progress of the marked instructions and the instruction groups they form a part of. The stall counters count cycles to give an indication of when certain delays associated with particular instructions occur and how serious the delays are.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
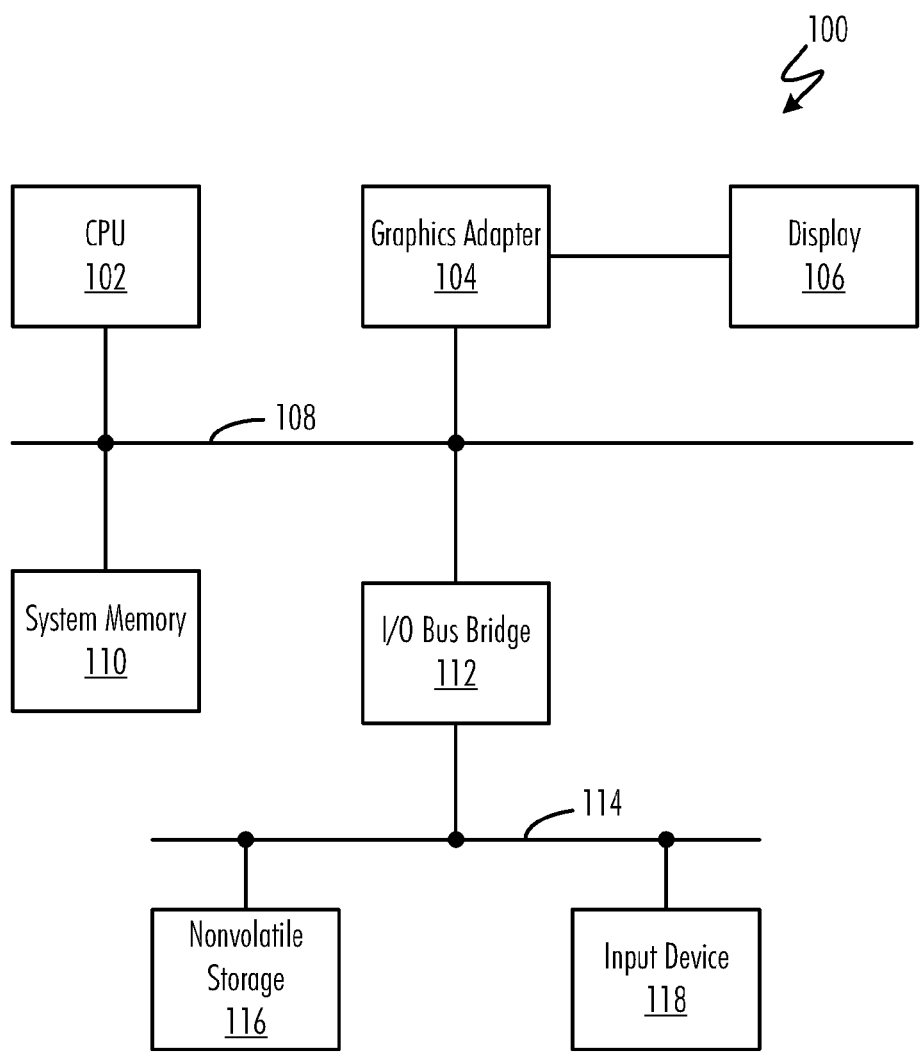
FIG. 1 is a diagram of a data processing system in which a preferred embodiment of the present invention may be implemented.

With reference now to the figures and, in particular, to FIG. 1, there is depicted a block diagram of a data processing system 100 in which a preferred embodiment of the present invention may be implemented. Data processing system 100 includes a central processing unit (CPU) 102, which is connected to a system bus 108. In the exemplary embodiment, data processing system 100 includes a graphics adapter 104 also connected to system bus 108, for providing user interface information to a display 106.

Also connected to system bus 108 are a system memory 110 and an input/output (I/O) bus bridge 112. I/O bus bridge 112 couples an I/O bus 114 to system bus 108, relaying and/or transforming data transactions from one bus to the other. Peripheral devices such as nonvolatile storage 116, which may be a hard disk drive, and input device 118, which may include a conventional mouse, a trackball, or the like, is connected to I/O bus 114.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention.

Figure 2:
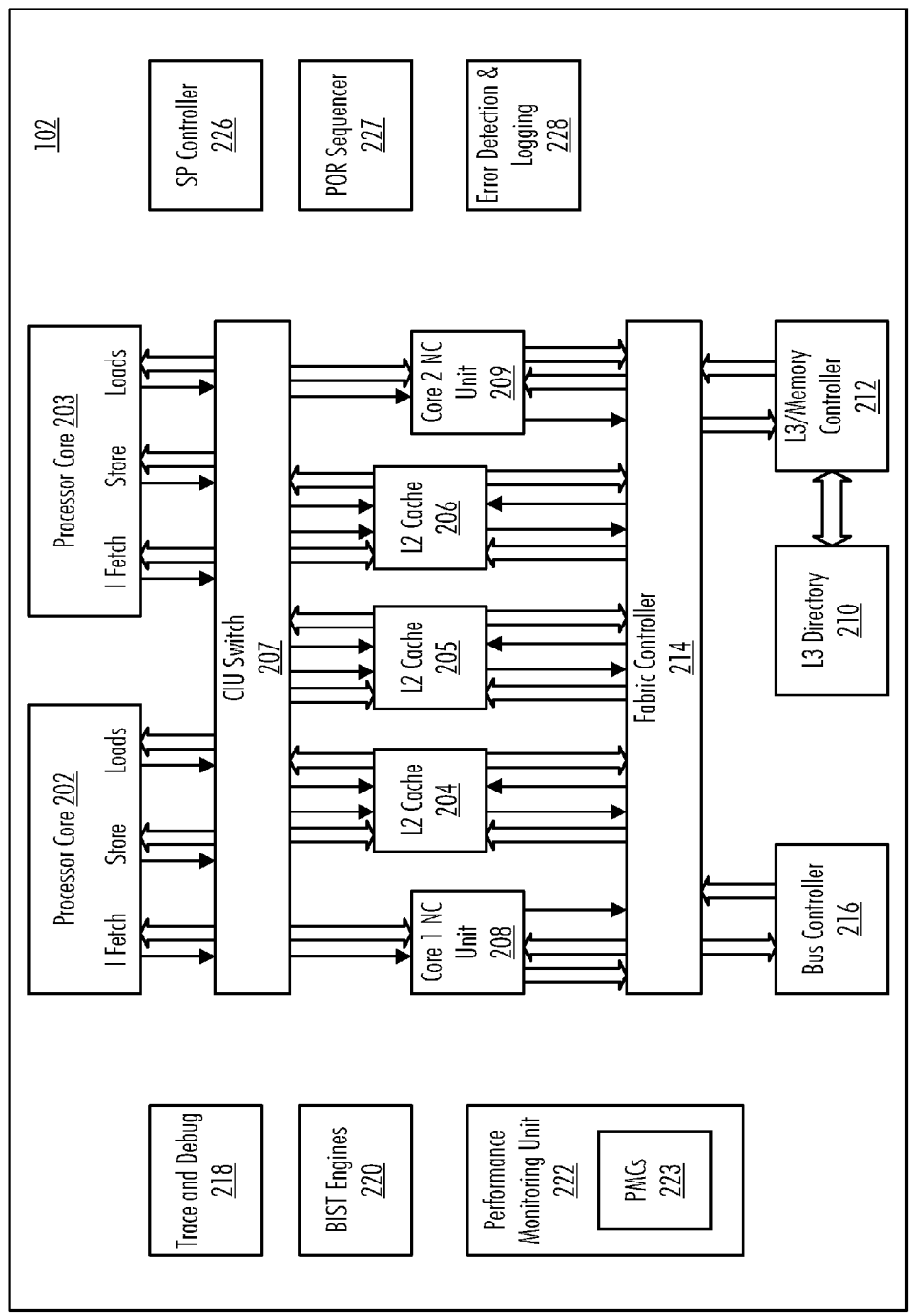
FIG. 2 is a diagram of a central processing unit (CPU) in accordance with a preferred embodiment of the present invention.

CPU 102 described in FIG. 1 is preferably a microprocessor such as the POWER5 microprocessor manufactured by International Business Machines, Inc. of Armonk, N.Y. With reference now to FIG. 2, such an exemplary microprocessor is depicted as CPU 102. In the preferred embodiment, at least two processor cores 202 and 203 are included in CPU 102. Processor cores 202 and 203 share a unified second-level cache system depicted as L2 (level 2) caches 204, 205, and 206, through a core interface unit (CIU) 207. CIU 207 is a crossbar switch between L2 caches 204, 205, and 206 (each of which is implemented as a separate, autonomous cache controller) and processor cores 202 and 203. Each of L2 caches 204, 205, and 206 can operate concurrently and feed multiple bytes of data per cycle. CIU 207 connects each of L2 caches 204, 205, and 206 to either an L1 (level 1) data cache (shown as D-cache 311 in FIG. 3) or an L1 instruction cache (shown as I-cache 320 in FIG. 3) in either of processor cores 202 and 203. Additionally, CIU 207 accepts stores from processor cores 202 and 203 across multiple-byte-wide buses and sequences them to L2 caches 204, 205, and 206. Each of processor cores 202 and 203 has associated with it a non-cacheable (NC) unit (shown as NC units 208 and 209) responsible for handling instruction-serializing functions and performing any non-cacheable operations in the storage hierarchy. Conceptually NC units 208 and 209 form part of the L2 cache system (L2 caches 204, 205, and 206).

An L3 (level 3) directory 210 for an L3 (level 3) cache and an associated L3 controller 212 are also part of CPU 102. The actual L3 cache may reside onboard CPU 102 or on (a) separate chip(s). A separate functional unit, referred to as a fabric controller 214, is responsible for controlling data flow between L2 caches 204, 205, and 206, NC units 208 and 209, and L3 controller 212. Fabric controller 214 also controls input/output (I/O) data flow to other CPUs and other I/O devices (not shown) via bus controller 216.

Also included within CPU 102 are functions which may be referred to as "pervasive functions." These include a trace and debug facility 218 used for first-failure data capture, a built-in self-test (BIST) engine 220, a performance-monitoring unit (PMU) 222, a service processor (SP) controller 226 used to interface with a service processor (not shown) to control the overall data processing system 100 shown in FIG. 1, a power-on reset (POR) sequencer 227 for sequencing logic, and an error detection and logging circuitry 228.

As depicted, PMU 222 includes performance monitor counters (PMC) 223, which are used to count the occurrence of internal events that impact the performance of the processor. For example, PMU 222 may monitor processor cycles, instructions completed, or other internal events. In a preferred embodiment of the present invention, PMU 222 is used to monitor selected instructions to determine if, how, and to what extent the selected instructions lead to stall conditions in CPU 102. PMU 222 is described in more detail in FIG. 4 and the accompanying text below.

Figure 3:
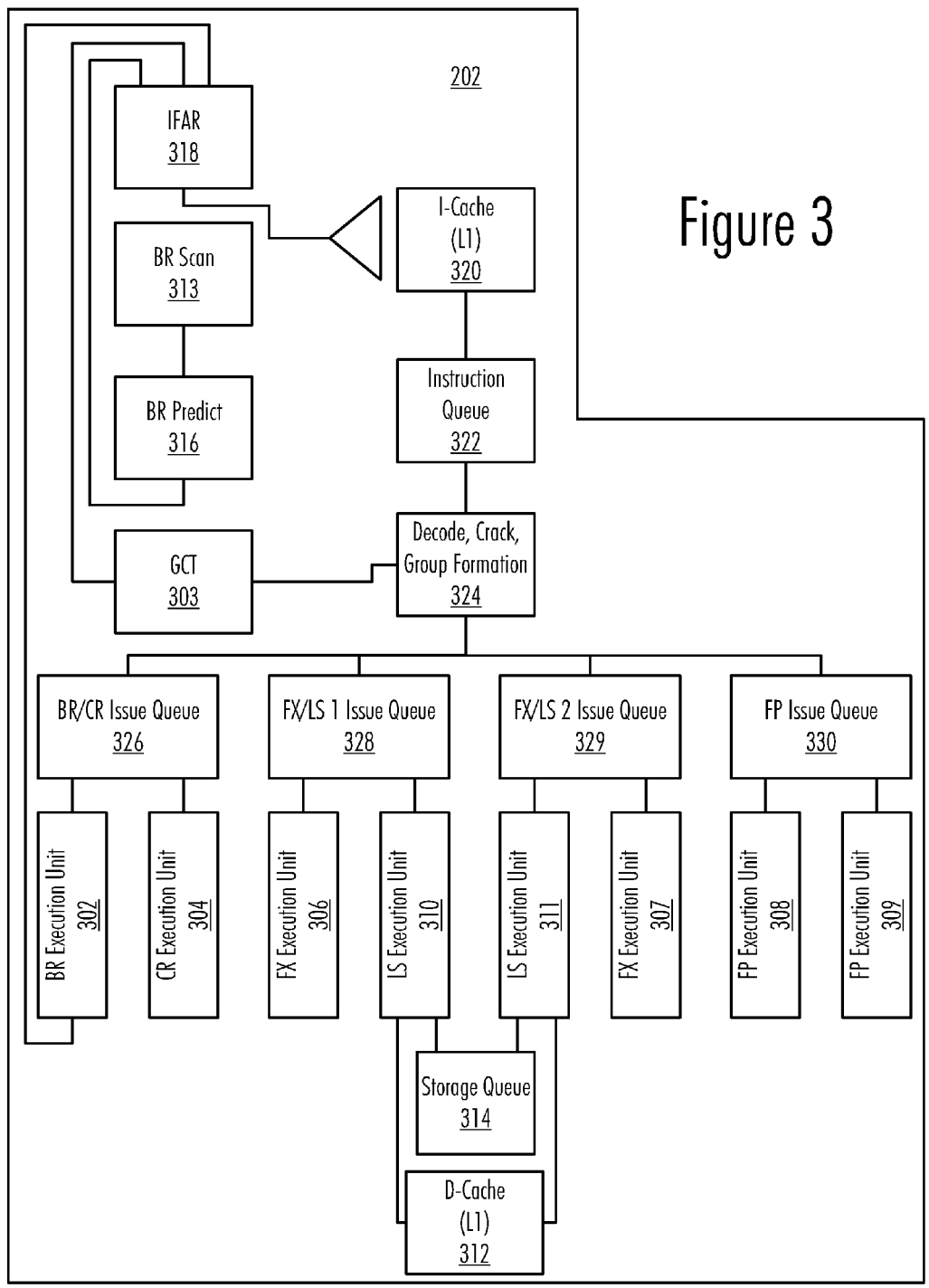
FIG. 3 is a diagram of a processor core in accordance with a preferred embodiment of the present invention.

With reference now to FIG. 3, there is depicted a high-level block diagram of processor core 202 depicted in FIG. 2. The two processor cores 202 and 203 shown in FIG. 2 are on a single chip, are identical, and provide a two-way Symmetric Multiprocessing (SMP) computational model to software. Under the SMP model, any idle processor core can be assigned any task, and additional CPUs 102 can be added to improve performance and handle increased loads.

The internal microarchitecture of processor core 202 is preferably a superscalar design supporting speculative and out-of-order execution. In the exemplary configuration depicted in FIG. 3, multiple instructions can be issued each cycle and multiple instruction results may be generated at each cycle. In the superscalar architecture described in FIG. 3, multiple execution units (also commonly referred to as "functional units") are provided to allow multiple instructions to be executed simultaneously.

As is commonly the case in superscalar architectures, each of the execution units is specialized so as to execute certain classes of instructions. In FIG. 3, branch (BR) execution unit 302 executes branch instructions, condition register (CR) execution unit 304 for executes CR-modifying instructions (i.e., instructions that set or clear condition flags), fixed point (FX) execution units 306 and 307 for executing fixed-point instructions, load-store execution units (LSU) 310 and 311 for executing load and store instructions, and floating-point (FP) execution units 308 and 309 for executing floating-point instructions. LSUs 310, each capable of performing address-generation arithmetic, work with data cache (D-cache) 312 and storage queue 314 to provide data to FP execution units 308 and 309.

At this point, it should be pointed out that the "instructions" executed by the execution units in processor core 202 are more correctly referred to as "internal operations" or "IOPs." The reason for this is that a single assembly language instruction may involve the execution of multiple IOPs. For example, many arithmetic operations (such as integer addition and subtraction) typically affect the processor's condition flags, such as the carry flag, zero flag, overflow flag, etc. For such instructions, two IOPs would be executed in this exemplary architecture, one for performing the actual arithmetic (to be executed by one of FX execution units 306 and 307), and the other for setting or clearing the condition register flags accordingly. Because each IOP corresponds to a particular assembly language instruction and for most assembly language instructions the correspondence is one-to-one, however, the terms IOP and instruction are used herein in a more or less interchangeable sense when referring to IOPs, although it should be understood that the term "instruction" is also used herein in the sense of an assembly language instruction. Which is intended should immediately follow from which portion of the processor datapath is being described. Until the instructions are "cracked" (see below), they exist as single assembly language instructions. After "cracking" the "instructions" are made up of the IOPs.

Returning now to FIG. 3, the operation of processor core 202 will now be described. Instructions that are fetched from the computer's memory system (via L2 cache memory) are loaded into instruction cache (I-cache) 320 to await execution, according to the contents of instruction-fetch address register (IFAR) 318, which is used to store the address of the next instruction(s) to fetch. One skilled in the art will recognize that under normal circumstances, the value of IFAR 318 increases incrementally as non-branch instructions are executed and is replaced with a new value whenever an unconditional branch instruction is executed. For conditional branches, however, the value of IFAR 318 is derived through a process of branch prediction, which will be described shortly.

Instructions are received from I-cache 320 and forwarded to instruction queue 322, which serves to order the instructions in according to the way the instructions would be executed in a non-superscalar processor. Decode, crack, and group (DCG) unit 324 pulls instructions from instruction queue 322 and readies the instructions for execution. More specifically, DCG unit 324 performs three functions. DCG unit 324 first decodes the instructions received from instruction queue 322 to determine the actual operations the instructions represent. Next, DCG unit 324 breaks down ("cracks") the operations into individual IOPs, as described above. Some instructions will "crack" into a single IOP, while others will "crack" into multiple IOPs. DCG unit 324 sends the resulting IOPs to the appropriate instruction issue queues: BR/CR issue queue 326 for branch instruction IOPs and CR-modifying IOPs, fixed-point/load-store (FX/LD) issue queues 328 and 329 for fixed-point arithmetic/logic IOPs and load/store IOPs, and floating-point (FP) issue queue 330 for floating point operation IOPs.

Branch instructions are handled through a process of branch prediction, as mentioned above. Branch-prediction scan logic (BR scan) 313 scans fetched instructions located in I-cache 320, looking for multiple branches each cycle. Depending upon the branch type found, a branch-prediction mechanism denoted as BR predict 316 is engaged to predict whether the branch will be taken or not (if a conditional branch) and the address to execute next (assuming the previous prediction is correct in the case of a conditional branch). This address prediction is then placed in IFAR 318 to allow speculative fetching of subsequent instructions. Branch instructions flow through I-cache 320, instruction queue 322, decode, crack and group (DCG) unit 324, and (as IOPs) branch/condition register (BR/CR) issue queue 326 until the branch instruction IOPs ultimately reach and are executed in BR execution unit 302, where the actual outcomes of the branches are determined. At that point, if the predictions were found to be correct, the branch instructions are simply completed as with any other instruction. If a prediction is found to be incorrect, the instruction-fetch logic, including BR scan 313 and BR predict 316, causes any speculatively fetched instructions that were erroneously fetched due to the incorrect prediction to be discarded and begins refetching instructions along the corrected control flow.

Instructions are fetched from I-cache 320 on the basis of the contents of IFAR 318. IFAR 318 is normally loaded with an address determined by the branch-prediction logic described above. For cases in which the branch-prediction logic is in error, the branch-execution unit will cause IFAR 318 to be loaded with the corrected address of the instruction stream to be fetched. Additionally, there are other factors that can cause a redirection of the instruction stream, some based on internal events, others on interrupts from external events. In any case, once IFAR 318 is loaded, I-cache 320 is accessed to retrieve multiple instructions per cycle. The I-cache 320 is accessed using an I-cache directory (IDIR) (not shown), which is indexed by the effective address of the instruction to provide required real addresses. On an I-cache 320 cache miss, instructions are returned from the L2 cache (204 in FIG. 2).

In a preferred embodiment, CPU 102 uses a translation-lookaside buffer (TLB) and a segment-lookaside buffer (SLB) (neither shown) to translate from the effective address (EA) used by software and the real address (RA) used by hardware to locate instructions and data in storage. The EA, RA pair is stored in a two-way set-associative array, called the effective-to-real address translation (ERAT) table (not shown). Preferably, CPU 102 implements separate ERATs for instruction-cache (IERAT) and data-cache (DERAT) accesses. Both ERATs are indexed using the effective address.

As instructions (through their respective IOPs) are executed out of order, it is necessary to remember the program order of all instructions in flight. To minimize the logic necessary to track a large number of in-flight instructions, DCG unit 324 organizes instructions (via their corresponding IOPs) into groups. The individual groups are tracked through the system. That is, the state of the machine is preserved at group boundaries, not at an instruction boundary within a group. Any exception causes the machine to be restored to the state of the oldest group prior to the exception.

A group contains multiple IOPs. In a preferred embodiment, DCG unit 324 places IOPs sequentially in a group—the first IOP (in program order) is placed in slot 0, the next one in slot 1, and so on. Slot 4 is reserved solely for branch instructions. If required, NOPs ("no-operation" IOPs) are inserted to force the branch instruction to be in the fourth slot. If there is no branch instruction, slot 4 contains a NOP. Only one group of instructions is dispatched, i.e., moved into issue queues, in a cycle, and all instructions in a group are dispatched together. Groups are dispatched in program order. Individual IOPs are issued from the issue queues to the execution units (out of program order) as the execution units become available.

Results are committed, i.e., released to downstream logic, when the group completes. A group can complete when the group has attained "next-to-complete" (NTC) status and when all IOPs in the group have finished execution. A group attains NTC status when all previous groups have completed. Only one group can complete in a cycle.

For correct operation, certain instructions are not allowed to execute speculatively. To ensure that the instruction executes nonspeculatively, the group containing the instruction's IOPs is not executed until it has attained NTC status. This mechanism is called completion serialization. To simplify the implementation, such instructions form single-instruction groups. Examples of completion serialization instructions include loads and stores to guarded space and context-synchronizing instructions such as the move-to-machine-state-register instruction that is used to alter the state of the machine.

In order to implement out-of-order execution, many, but not all, of the registers in the processor architecture are renamed. To ensure proper execution of these instructions, any IOP that sets a non-renamed register must terminate a group.

Groups are dispatched into the issue queues one group at a time. As a group is dispatched, control information for the group is stored in a group completion table (GCT) 303. GCT 303 can store information for up to 20 groups. The primary information stored in the GCT comprises the instructions in the group, each instruction's program order, and each instruction's execution order, which, in a superscalar processor, is often different from the program order. The GCT entry also contains the address of the first instruction in the group. As instructions (or more, specifically, the instructions' corresponding IOPs) finish executing, the results of those instructions are registered in the GCT entry for the group. Information is maintained in the GCT until the group is retired, i.e., either all of its results are committed, or the group is flushed from the system.

IOPs are dispatched into the top of an issue queue, such as FP issue queue 330, FX/LD issue queues 328 and 329 and BR/CR issue queue 326. As each IOP is issued from the queue, the remaining IOPs move down in the queue. In the case of two queues feeding a common execution unit (not shown in FIG. 3), the two queues are interleaved. The oldest IOP in the common interleaved queue that has all of its sources set (i.e., that has available to it all data needed to execute the IOP) is issued to the execution unit.

Figure 4:
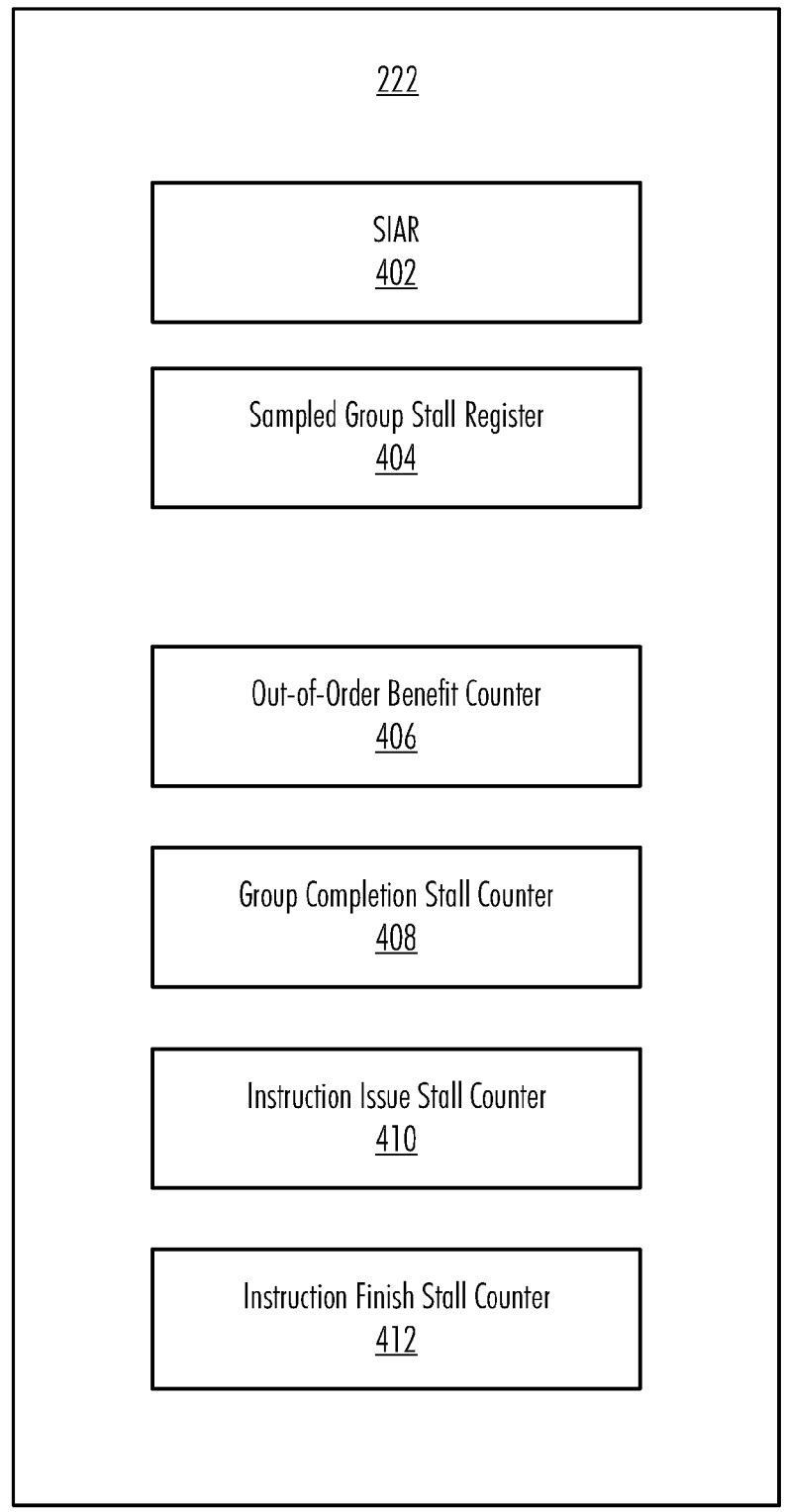
FIG. 4 is a diagram of a performance monitoring unit (PMU) in accordance with a preferred embodiment of the present invention.

FIG. 4 is a diagram illustrating a performance monitoring unit (PMU) 222 in accordance with a preferred embodiment of the present invention. PMU 222 detects internal events that take place within the processor and adjusts various special-purpose registers (registers 402, 404, 406, 408, 410, and 412) in response, so as to record performance-related information. While registers 402, 404, 406, 408, 410, and 412 are shown here in FIG. 4 as being an integral part of PMU 222, one skilled in the art will also recognize that such "registers" might instead be contained in random-access or cache memory external to PMU 222 in an alternative embodiment of the invention.

In a preferred embodiment of the present invention, registers 402, 404, 406, 408, 410, and 412 are used to capture information about processor stall conditions relating to certain monitored instructions. For this purpose, the PMU selects (samples) certain instructions from the instruction stream for performance monitoring. Which instructions are selected for sampling may be determined on the basis of filtering criteria enabled in PMU 222 by software. Once criteria for sampling are established, instructions from the currently executing instruction stream that meet the filtering criteria are tagged or "marked" and their progress monitored as they flow through the processor. A method for performing such monitoring is described in U.S. Pat. No. 6,574,727, which is assigned to the assignee hereof and incorporated herein by reference in its entirety.

As the marked instruction flows through the processor, the progress of the instruction is monitored by PMU 222. Specifically, PMU 222 detects particular "events" that occur in conjunction with the marked instruction. In particular, PMU 222 monitors these events to acquire information regarding stall conditions that may arise in the course of executing the marked instruction.

A stall condition arises when some or all of the processor's datapath enters an idle state during the processing of one or more instructions. Stall conditions may arise for a number of reasons, such as cache misses, mispredicted branches, the execution of long latency instructions in parallel with shorter latency instructions, and various other reasons.

The various special-purpose registers in PMU 222 are as follows. Sample instruction address register (SIAR) 402 stores the address of the most recently completed group of instructions. As an instruction completes, the address of the completed instruction is loaded into SIAR 402. Also, if during the execution of a group containing a marked instruction a stall condition arises, stall condition data is recorded in sampled group stall register 404. Stall condition data represents conditions that give rise to a stall condition, such as a cache miss, branch misprediction, long latency instruction, and so forth. Sampled group stall register 404, therefore, is used to store an identification of a clause for a stall condition that arises during the execution of a group containing a marked instruction.

Another series of special-purpose registers in PMU 222 are the sample instruction stall counters 406, 408, 410, and 412. These counters are used to measure the number of clock cycles between certain events in the execution of a marked instruction and the group the marked instruction belongs to. Out of order benefit counter 406 counts the number of cycles between the completion of the marked instruction and the marked instruction's group attaining next to complete (NTC) status. This information helps determine what benefit, if any, is attained through out of order execution of the marked instruction. Group completion stall counter 408 measures the number of cycles between the marked instruction's group's obtaining NTC status and the completion of the group. Instruction issue stall counter 410 counts the number of cycles between the marked instruction's group's attaining NTC status and the marked instruction's being issued to an execution unit. Instruction finish stall counter 412 counts the number of cycles between the marked instruction's group's attaining NTC status and the completion of the marked instruction. These stall counters provide valuable information regarding the role a marked instruction plays in the presence of stall conditions. For instance, these counters allow one to make a determination as to when a stall condition may occur in conjunction with a marked instruction (i.e., at what stage of processing) and to what extent such stall condition may affect performance.

Figure 5:
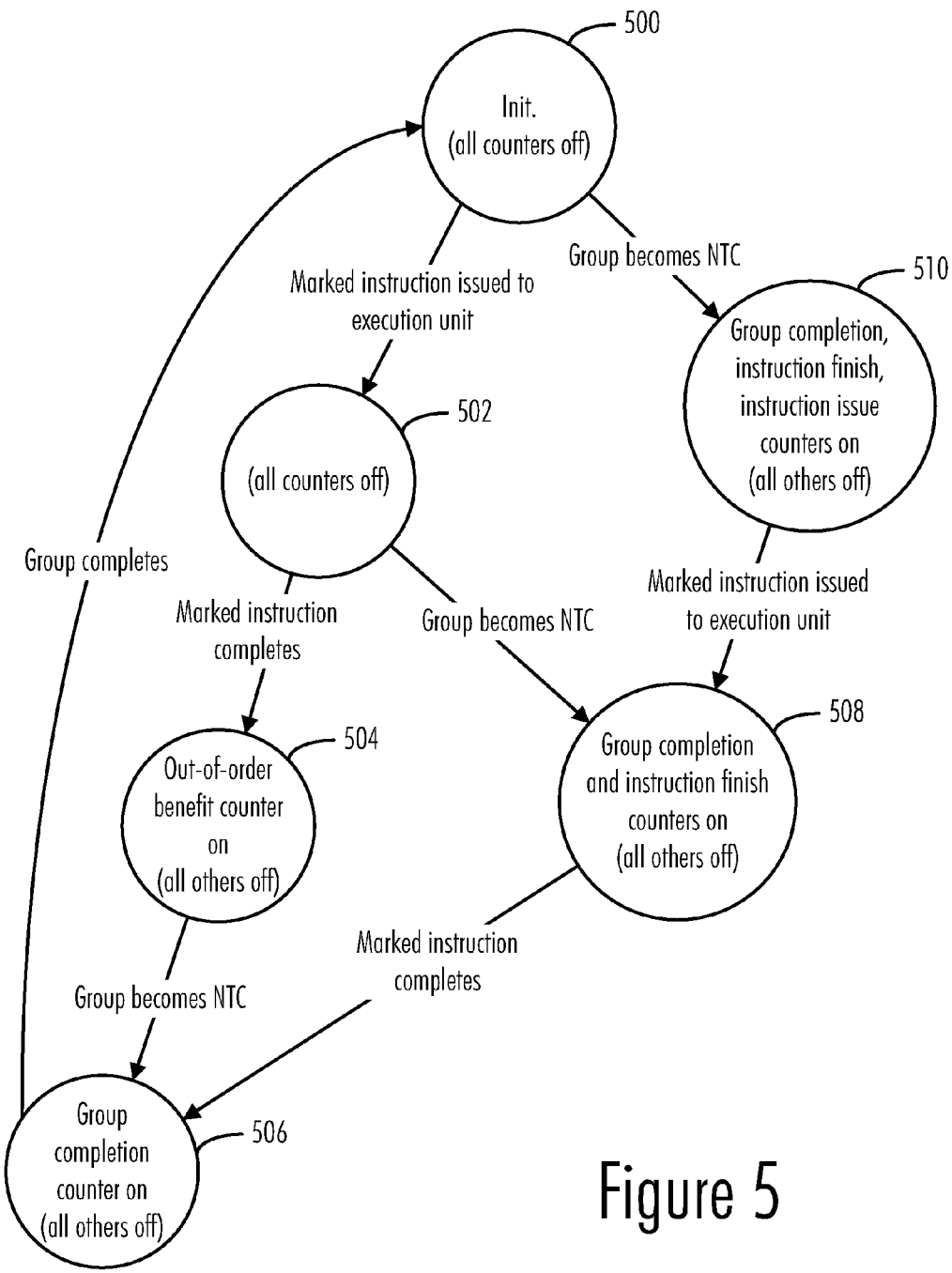
FIG. 5 is a state diagram illustrating operation of the PMU in a preferred embodiment of the present invention.

The sampled instruction stall counters are activated or deactivated by PMU 222 when PMU 222 detects particular events in the processing of a marked instruction and the group the marked instruction belongs to. When a counter is activated, the counter is incremented at each clock cycle. FIG. 5 is a state diagram illustrating the manner in which sampled instruction stall counters are activated and deactivated in response to the events detected by PMU 222. In the initial state 500, all counters are deactivated (i.e., none of the counters are incrementing). If a marked instruction is issued to an execution unit while in initial state 500, PMU 222 enters state 502, in which all of the sampled instruction stall counters remained deactivated. If, while in state 502, the marked instruction is completed, state 504 is entered and out of order benefit counter 406 is activated. Thus, while in state 504, out of order benefit counter 406 is incremented at each clock cycle. Once the group to which the marked instruction belongs has attained NTC status, state 506 is entered. In state 506, out of order benefit counter is deactivated (i.e., the counter no longer increments at each clock cycle, but remains fixed), and group completion stall counter 408 becomes activated. Once the group completes, while in state 506, group completion stall counter 408 is deactivated and initial state 500 is returned to.

Returning now to state 502, if instead of the marked instruction completing the marked instruction's group obtains NTC status, state 508 is entered. In state 508, both group completion stall counter 408 and instruction finish stall counter 412 are activated. Then, once a marked instruction completes, state 506 (described above) is entered, and instruction finish stall counter 412 is deactivated while group completion stall counter 408 remains activated. Finally, now returning to initial state 500, if at the outset the group the marked instruction belongs to attains NTC status, state 510 is reached in which group completion stall counter 408, instruction issue stall counter 410, and instruction finish stall counter 412 are all activated. If, while in state 510, the marked instruction is issued to an execution unit, state 508 (discussed previously, above) is entered, in which instruction issue stall counter 410 is deactivated and group completion stall counter 408 and instruction finish stall counter 412 remain activated.

The sampled instruction stall counters (counters 406, 408, 410, and 412), in addition to being updated by PMU 222 in response to internal processor events, may also be read or written to by software. Further, these counters may be reset to zero by the hardware when a new sampled instruction is picked or they can be allowed to accumulate their count (i.e., they can record a cumulative total number of cycles across several marked instructions/groups). In a preferred embodiment, either of these modes (reset to zero on a new sampled instruction or acquire a cumulative total) may be selected using a soft switch (i.e., a switch or setting that can be defined by software).

Further, to avoid a situation in which one or more counters run indefinitely, PMU 222 may employ a mechanism to stop/deactivate counters after a certain pre-determined number of cycles has been reached, irrespective of whether the usual terminating event has been reached. Additionally, PMU 222 can employ a mechanism to trigger an interrupt of the processor for the purpose of servicing the sampled instruction stall counters. These interrupts can be triggered on a periodic basis or in response to certain events (such as one or more of the counters reaching a particular threshold). This can allow for data to be collected from a number of sampled instructions independently over time.

One of the preferred implementations of the invention is or includes a computer program, namely, a set of instructions (program code) or other functional descriptive material in a code module that may, for example, be resident in the random access memory, firmware, or microprogramming of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an;" the same holds true for the use in the claims of definite articles. Where the word "or" is used in the claims, it is used in an inclusive sense (i.e., "A and/or B," as opposed to "either A or B").

What is claimed is:

1. A data processor comprising:
a datapath of a processor, wherein the datapath includes instruction grouping logic and a plurality of execution units;
a performance monitoring unit configured to mark only each of one or more particular instructions from a plurality of instructions in a currently executing instruction stream that meet one or more filtering criteria applied to the currently executing instruction stream and configured to monitor the progress of the one or more particular instructions as they flow through the datapath;
a plurality of dedicated registers accessible to the performance monitoring unit, wherein the performance monitoring unit selects at least one of the one or more particular instructions for which to capture stall condition data so as to obtain selected instructions, wherein the stall condition data is stored within a group stall register of the plurality of dedicated registers and represents conditions giving rise to a stall condition;
wherein the grouping logic organizes the plurality of instructions in the datapath into groups prior to execution; and
wherein, in response to a particular instruction from the selected particular instructions being organized into a particular group, the performance monitoring unit collects a plurality of cycle counts relating to events associated with the data processor's processing of the particular instruction and the particular group, and wherein the performance monitoring unit stores the plurality of cycle counts in the plurality of dedicated registers;
wherein each filtering criteria applied is enabled in the performance monitoring unit by software;
the performance monitoring unit detecting one or more events that occur in conjunction with the particular group;
determining one or more of the events is a stall condition that has occurred with respect to the particular group;
determining a cause for the stall condition; and
recording the determined cause of the stall condition in one of the plurality of dedicated registers.

2. The data processor of claim 1, wherein the plurality of cycle counts collected includes a count of a number of cycles between completion of the at least one particular instruction and the particular group's becoming next-to-complete, and wherein the one or more particular instructions are executed out-of-order.

3. The data processor of claim 1, wherein the plurality of cycle counts collected includes a count of a number of cycles between the particular group's becoming next-to-complete and an issuance of the at least one particular instruction to an execution unit of the data processor.

4. The data processor of claim 1, wherein the plurality of cycle counts collected includes a count of a number of cycles between the particular group's becoming next-to-complete and the completion of the particular group.

5. The data processor of claim 1, further comprising:
breaking down the at least one of the one or more particular instructions in to one or more internal operations, wherein the internal operations are dispatched to the top of an issue queue;
activating a benefit counter for the one or more particular instructions;
accumulating the plurality of cycle counts in the plurality of dedicated registers across the one or more particular instructions and one or more groups associated with the one or more particular instructions;

performing completion serialization of the particular group, wherein the completion serialization comprises:
the particular group attaining a next-to-complete status;
committing results of the particular group;
deactivating the benefit counter; and
wherein the one or more internal operations are not permitted to speculatively execute;
dispatching all instructions in the particular group together, wherein the one or more internal operations are issued from one or more issue queues, out of order, as execution units become available;
responsive to a cycle count reaching a pre-determined number of cycles, deactivating a counter; and
responsive to detecting a certain event, triggering an interruption of the processor to service the counter.

6. A method of collecting information regarding stall conditions in a data processor, the method comprising:
selecting, by a performance monitoring unit of the data processor, a subset of a plurality of instructions in a currently executing instruction stream of the data processor for stall condition data capture collection, wherein captured stall condition data is stored within a group stall register and represents conditions giving rise to a stall condition;
marking each of the instructions within the subset of the plurality of instructions, wherein the subset of the plurality of instructions meets one or more filtering criteria applied to the currently executing instruction stream;
organizing, by the data processor, the plurality of instructions to form a plurality of groups for execution; and
in response to at least one particular instruction from the selected subset of instructions being incorporated into a particular group, collecting, by the data processor, a plurality of cycle counts relating to events associated with the data processor's processing of the particular instruction and the particular group;
wherein each filtering criteria applied is enabled in the performance monitoring unit by software;
the performance monitoring unit detecting one or more events that occur in conjunction with the particular group;
determining one or more of the events is a stall condition that has occurred with respect to the particular group;
determining a cause for the stall condition; and
recording the determined cause of the stall condition in a register contained within the data processor.

7. The method of claim 6, wherein the plurality of cycle counts collected includes a count of a number of cycles between completion of the particular instruction and the particular group's becoming next-to-complete, and wherein the one or more particular instructions are executed out-of-order.

8. The method of claim 6, wherein the plurality of cycle counts collected includes a count of a number of cycles between the particular group's becoming next-to-complete and an issuance of the particular instruction to an execution unit of the data processor.

9. The method of claim 6, wherein the plurality of cycle counts collected includes a count of a number of cycles between the particular group's becoming next-to-complete and the completion of the particular group.

10. The method of claim 6, wherein the plurality of cycle counts are stored in registers contained within the data processor.

11. The method of claim 6, further comprising:
breaking down the at least one of the one or more particular instructions in to one or more internal operations, wherein the internal operations are dispatched to the top of an issue queue;
activating a benefit counter for the one or more particular instructions;
accumulating the plurality of cycle counts in a plurality of dedicated registers in the data processor across the one or more particular instructions and one or more groups associated with the one or more particular instructions;
performing completion serialization of the particular group, wherein the completion serialization comprises:
the particular group attaining a next-to-complete status;
committing results of the particular group;
deactivating the benefit counter; and
wherein the one or more internal operations are not permitted to speculatively execute;
dispatching all instructions in the particular group together, wherein the one or more internal operations are issued from one or more issue queues, out of order, as execution units become available;
responsive to a cycle count reaching a pre-determined number of cycles, deactivating a counter; and
responsive to detecting a certain event, triggering an interruption of the processor to service the counter.

12. A computer program product in a non-transitory computer readable storage medium, for capturing information regarding stall conditions in a data processor, comprising functional descriptive material that, when executed by the data processor, causes the data processor to perform the actions of:
selecting a subset of the plurality of instructions in a currently executing instruction stream for stall condition data capture collection wherein captured stall condition data is stored within a group stall register and represents conditions giving rise to a stall condition;
marking each of the instructions within the subset of the plurality of instructions, wherein the subset of the plurality of instructions meet one or more filtering criteria applied to the currently executing instruction stream;
organizing the plurality of instructions to form a plurality of groups for execution; and
in response to a particular instruction from the selected subset of instructions being incorporated into a particular group, collecting a plurality of cycle counts relating to events associated with the data processor's processing of the particular instruction and the particular group;
wherein each filtering criteria applied is enabled in software;
detecting one or more events that occur in conjunction with the particular group;
determining one or more of the events is a stall condition that has occurred with respect to the particular group;
determining a cause for the stall condition; and
recording the determined cause of the stall condition in a register contained within the data processor.

13. The computer program product of claim 12, wherein the plurality of cycle counts collected includes a count of a number of cycles between completion of the particular instruction and the particular group's becoming next-to-complete, and wherein the one or more particular instructions are executed out-of-order.

14. The computer program product of claim 12, wherein the plurality of cycle counts collected includes a count of a number of cycles between the particular group's becoming next-to-complete and an issuance of the particular instruction to an execution unit of the data processor.

15. The computer program product of claim 12, wherein the plurality of cycle counts collected includes a count of a number of cycles between the particular group's becoming next-to-complete and the completion of the particular group.

16. The computer program product of claim 12, wherein the plurality of cycle counts are stored in registers contained within the data processor.

17. The computer program product of claim 12, comprising functional descriptive material that when executed by the data processor, causes the data processor to perform the additional actions of:

breaking down the at least one of the one or more particular instructions in to one or more internal operations, wherein the internal operations are dispatched to the top of an issue queue;

activating a benefit counter for the one or more particular instructions;

accumulating the plurality of cycle counts in a plurality of dedicated registers in the data processor across the one or more particular instructions and one or more groups associated with the one or more particular instructions;

performing completion serialization of the particular group, wherein the completion serialization comprises:
the particular group attaining a next-to-complete status;
committing results of the particular group;
deactivating the benefit counter; and
wherein the one or more internal operations are not permitted to speculatively execute;

dispatching all instructions in the particular group together, wherein the one or more internal operations are issued from one or more issue queues, out of order, as execution units become available;

responsive to a cycle count reaching a pre-determined number of cycles, deactivating a counter; and responsive to detecting a certain event, triggering an interruption of the processor to service the counter.

18. A system for collecting information regarding stall conditions in a data processor, the system comprising:

means for selecting, by a performance monitoring unit of the data processor, a subset of a plurality of instructions in a currently executing instruction stream of the data processor for stall condition data capture collection, wherein captured stall condition data is stored within a group stall register and represents conditions giving rise to a stall condition;

means for marking each of the instructions within the subset of the plurality of instructions, wherein the subset of the plurality of instructions meets one or more filtering criteria applied to the currently executing instruction stream, wherein each filtering criteria applied is enabled in software;

means for organizing, by the data processor, the plurality of instructions to form a plurality of groups for execution; and means, in response to at least one particular instruction from the selected subset of instructions being incorporated into a particular group, for collecting, by the data processor, a plurality of cycle counts relating to events associated with the data processor's processing of the particular instruction and the particular group;

means for detecting one or more events that occur in conjunction with the particular group;

means for determining one or more of the events is a stall condition that has occurred with respect to the particular group;

means for determining a cause for the stall condition; and means for recording the determined cause of the stall condition in a register contained within the data processor.

* * * * *